Patented Apr. 6, 1954

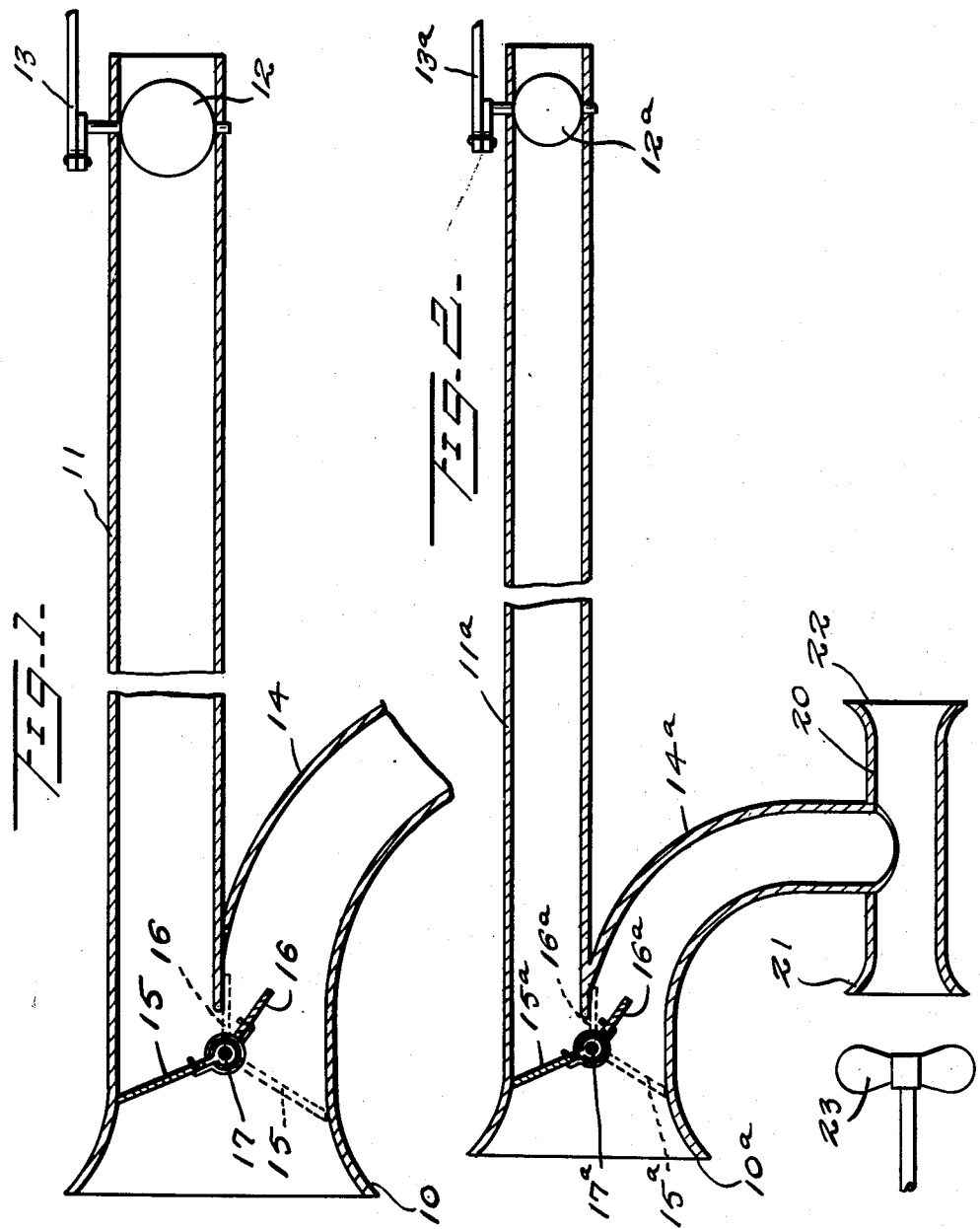

2,674,176

UNITED STATES PATENT OFFICE 2,674,176

VENTILATION CONTROL FOR VEHICLES

John C. Backe, Gaylord, Mich.

Application June 15, 1951, Serial No. 231,851

3 Claims. (Cl. 98—2)

This invention relates to a ventilating system for motor vehicles, and comprises a continuation-in-part of my copending application Serial No. 89,525, filed April 25, 1949, now Patent Number 2,604,837.

A primary object of this invention is the provision of an improved and simplified ventilating system for supplying fresh air to a motor vehicle.

An additional object of this invention is the provision of a device of this character whereby air may be supplied to and returned from a vehicle through the same duct.

Still another object of the invention is the provision of a device of this character whereby suction means are provided to insure ventilation even when the vehicle is stationary.

Other objects will in part be obvious and in part be pointed out as the description of the invention proceeds, and shown in the accompanying drawing, wherein there are disclosed preferred embodiments of this inventive concept.

In the drawing:

Fig. 1 is a fragmentary longitudinal sectional view of one form of device embodying the instant invention; and Fig. 2 is a similar view of a modified form of construction.

Referring now to the drawing, and more particularly to Fig. 1, there is generally indicated at 10 an air scoop adapted to be positioned beneath the hood of a motor vehicle adjacent the forward end thereof to insure the admission of fresh air. Extending from the air scoop 10 is a tubular member 11 which extends to the interior of the vehicle in any desired location, and which is provided with any suitable valve means 12 adapted to be controlled as by a control rod 13 from the interior of the vehicle.

Diverging from the air scoop 10 and coplanar with the tube 11 is an outlet 14, while a suitable pair of separate spring loaded valves 15 and 16 are both mounted on a supporting rod 17 adjacent the divergence of the members 11 and 14. The valve 15 is of a length to abut the adjacent walls of members 10 and 11 alternately according to its position of adjustment, while valve 16 is stopped by engagement with the wall of tube 11 at its intersection with tube 17. The valves 15 and 16 are adapted to be controlled in any desired manner, and the arrangement of the springs is such that one of said valves may continue to move after the other is seated against its associated stop until the desired operative position of both valves is achieved. It will thus be seen that with the valves 15 and 16 in the position shown in full lines in Fig. 1, air from the air scoop 10 is diverted into passage 14, this in turn creating a suction in tube 11, thus exhausting used air from the vehicle. Conversely, with the valves 15 and 16 in the position shown in dotted lines, it will be seen that the exhaust tube 14 is closed, and that fresh air is passed inwardly through the tube 11 into the interior of the vehicle, and that thus the tube 11 serves both as an inlet and an exhaust, when desired.

Referring now to Fig. 2, there is disclosed at 10a an air scoop similar to air scoop 10, communicating with tube 11a having therein a valve 12a operated by a control rod 13a in a manner similar to the previous modification. An outlet 14a is also provided to be described more fully hereinafter, while valves 15a and 16a mounted upon a suitable control rod 17a, operate in substantially the identical manner previously described.

Referring back now to the outlet 14a, at its lower extremity there is provided a tube 20 open at both ends and outwardly flared at both ends, as at 21 and 22, to provide a Venturi effect. The tube 20 is adapted to be positioned adjacent a fan 23 rotated in any desired manner by the motor, which fan may be the conventional engine fan or alternatively a small supplemental fan driven in any required manner. In this construction, it will be seen that with the valves 15a and 16a in the dotted line position, air is drawn into the vehicle, and similarly drawn out with the valves in the full line position as in the previous modification, so long as the vehicle is in motion. However, when the vehicle is stopped, a substantial suction may be effected by the passage of air from the fan 23 through the tube 20, thus effecting an exhaust of used air from the vehicle regardless of whether the same is in motion or not.

From the foregoing, it will now be seen that there is herein provided an improved and simplified ventilating system for motor vehicles utilizing a single conduit or tube for both inlet and exhaust purposes selectively as may be desired.

As many embodiments may be made of this inventive concept, and as many modifications may be made in the embodiment hereinbefore shown and described, it is to be understood that all matter herein is to be interpreted merely as illustrative and not in a limiting sense.

I claim:

1. In a ventilating system for motor vehicles, the combination of an air scoop, a duct leading therefrom into the interior of the vehicle, a suction duct leading therefrom to the exterior of the vehicle, valve means for selectively opening and closing said first duct relative to said scoop, and second separately movable valve means for opening said first duct to said suction duct when said first duct is closed to said scoop.

2. In a ventilating system for motor vehicles, the combination of an air scoop, a duct leading therefrom into the interior of the vehicle, a suction duct leading therefrom to the exterior of the vehicle, valve means for selectively opening and closing said first duct relative to said scoop, and second separately movable valve means for opening said first duct to said suction duct when said first duct is closed to said scoop, said second valve means closing the communication between said first duct and said suction duct when said first duct is open.

3. In a ventilating system for motor vehicles, the combination of an air scoop, a duct leading therefrom into the interior of the vehicle, a suction duct leading therefrom to the exterior of the vehicle, valve means for selectively opening and closing said first duct relative to said scoop, second separately movable valve means for opening said first duct to said suction duct when said first duct is closed to said scoop, said second valve means closing the communication between said first duct and said suction duct when said first duct is open, and a second air scoop communicating with said suction duct only.

References Cited in the file of this patent

UNITED STATES PATENTS

| Number | Name | Date |
|---|---|---|
| 1,617,939 | Burt | Feb. 15, 1927 |
| 1,787,561 | Askam | Jan. 6, 1931 |
| 1,956,123 | Givens | Apr. 24, 1934 |
| 2,084,787 | Zaustinsky | June 22, 1937 |
| 2,577,836 | Willson | Dec. 11, 1951 |

FOREIGN PATENTS

| Number | Country | Date |
|---|---|---|
| 149,596 | Switzerland | Nov. 16, 1931 |